Sept. 22, 1964     A. R. MORSE     3,149,377
FLOATING SCREW PLASTICIZING CYLINDER
Filed April 26, 1962
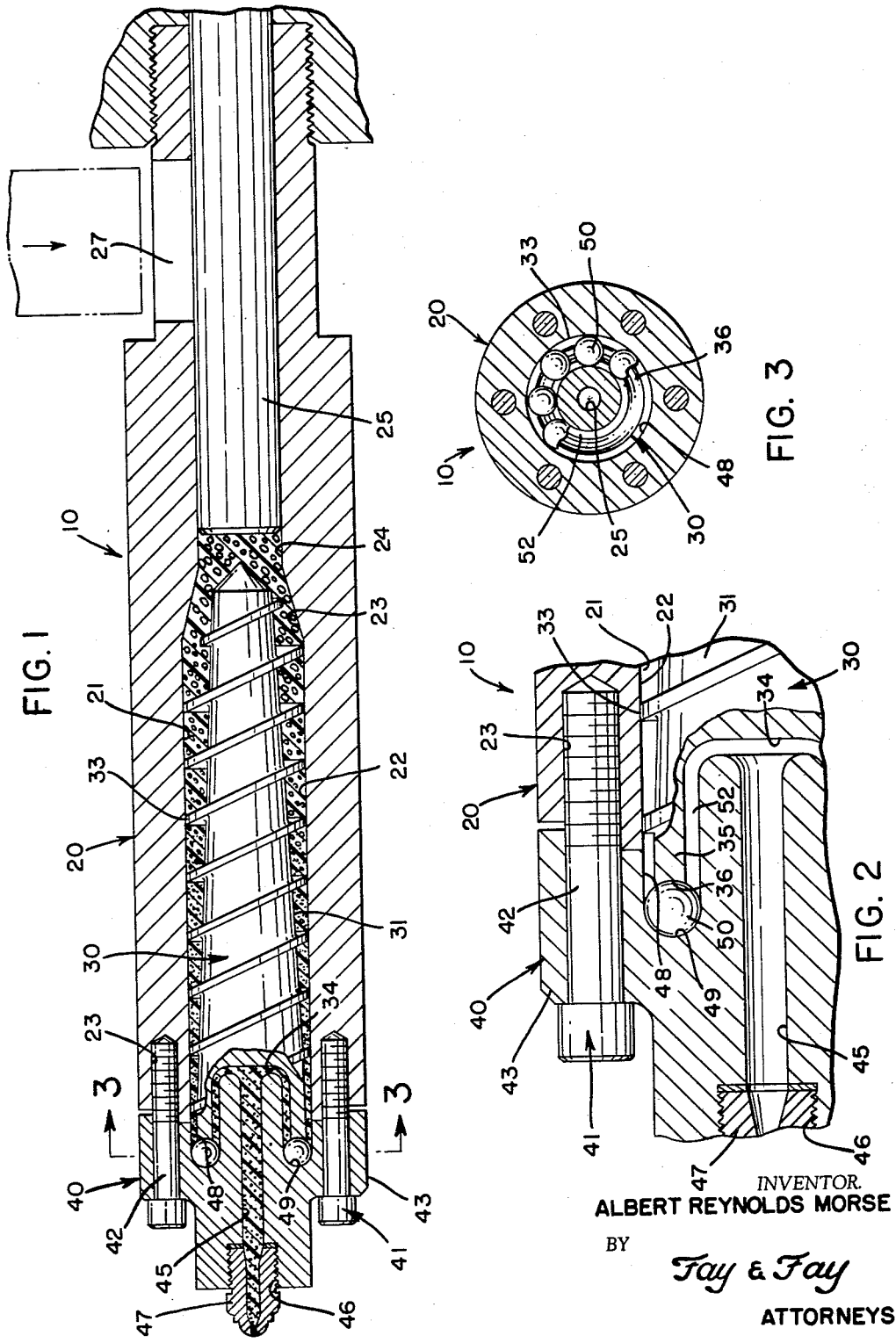
INVENTOR.
ALBERT REYNOLDS MORSE
BY
*Fay & Fay*
ATTORNEYS

United States Patent Office

3,149,377
Patented Sept. 22, 1964

1

3,149,377
FLOATING SCREW PLASTICIZING CYLINDER
Albert Reynolds Morse, Cleveland, Ohio, assignor to Injection Molders Supply Company, Cleveland, Ohio, a corporation of Ohio
Filed Apr. 26, 1962, Ser. No. 190,488
6 Claims. (Cl. 18—30)

This invention concerns a floating screw plasticizing cylinder for use in a plastic injection molding device and is adapted particularly for use in injection molding of thermoplastic materials such as, for example, polyolefins, styrenes, nylons, acrylics, cellulosics, polycarbonates, vinyls and acetals.

Broadly, the invention contemplates a floating screw plasticizing cylinder for use in a plastic injection molding device which includes an elongated housing means having an axial bore and an end structure having a reverse flow passage and a discharge opening for a connection to a mold or the like. An axially fixed free rotating screw is mounted adjacent the end structure in the first portion of the bore and defines with the first portion a helical passage in communication with the discharge opening through the reverse flow passage. The end of the screw which is adjacent the end structure defines with a portion of the reverse passage a bearing race which has a plurality of bearings disposed therein in an arrangement which permits flow through the reverse passage and between the bearings. A second portion of the housing bore located adjacent the first portion and axially remote from the end structure has a granular plastic material reservoir provided in communication therewith through an aperture intermediate its ends. Slidably mounted in the second portion of the bore for driven reciprocating movement past the aperture is a plunger which sequentially opens the aperture and introduces the material into the second portion of the bore and closes the aperture and compresses the material to create substantial pressure in the passages and through the discharge opening while the free rotating screw and associated bearings stir and churn the material in the passages by means of a shearing and wiping action resulting from their rotation.

The operation of the device is such that the granular plastic material is placed in the reservoir and the reciprocally mounted plunger is moved away from the helical passage past at least a portion of the aperture leading from the reservoir to allow the granular material to be introduced into the second portion of the bore which defines the path of the plunger. The plunger then advances toward the helical passage to compress the granular material into said passage under pressures of injection magnitude. Under the influence of these high pressures, often in excess of 20,000 p.s.i., the granular thermoplastic material is forced into and along the helical passage completely filling the same and imparting a rotational motion to the free rotating screw which stirs the material.

As the material moves along the helical passage and is stirred by the rotating screw it gradually becomes plasticized or fluidized under the influence of the heated housing.

The plasticized material flows under pressure created by the material behind it into the end structure and is further mixed and mulled by the action of the bearings as it passes through the bearing race. The material then flows on through the reverse flow passage and out through the discharge opening or nozzle into an associated mold.

The use of a plasticizing cylinder having an end structure with a reversed flow passage provides a greatly increased surface area for plasticizing of the material and eliminates various complicated screw mounting problems which have prevented successful use of screw type spreaders in the past. A more complete understanding of the principals involved in the reverse flow passage may be obtained by reference to U.S. Letters Patent Nos. 3,010,154, 2,977,634, and 2,961,706 assigned to the same assignee as the present application.

The prior art injection molding plasticizing devices, whether of the plunger or screw type, generally have had serious short-comings which the present floating screw spreader and plasticizing cylinder combination is designed to overcome. Through the use of the reverse flow design and the row of rotating bearings to facilitate rigid mounting of the self-propelled free-rotating screw, a more efficient and unique method of stirring and churning the plastic material inside the heating cylinder has been accomplished. The necessity of external power drives for spreaders, together with attendant mechanical complications and other difficulties which now handicap the so-called multiple screw type machines of the prior art, have been eliminated by the device of this invention with a resulting increase in efficiency of manufacture and increase in melt quality.

It will be recognized from the above discussion that the novel structure of this invention minimizes the importance of the critical tolerances between the screw flights and the housing bore because the motion of the thermoplastic material is always forward toward the discharge opening ahead of the positive pressure exerted on it by the plunger during injection.

With the problems of the prior art devices in mind, it is the general object of this invention to provide a floating screw spreader type of plasticizing cylinder for use in a plastic injection molding device which is of a highly simplified design and provides greatly increased melting and molding capacity over previous plasticizing devices.

It is a more specific object of this invention to provide a plastic injection molding device having a screw type spreader which by high pressure plunger densification substantially eliminates the usual voids in the flow passages and thereby provides increased plasticizing and injection molding capacity by providing more efficient heat transfer to the cold granular plastic material through the structure of the plasticizing cylinder combination.

It is a further object of the invention to provide improved agitation of thermoplastic material during plasticizing to eliminate mechanical drive and hollow plunger complexities present in the prior art type of rotating screw or paddle type spreaders.

A further object of this invention is to permit modification of standard injection machines to a form of screw type spreader at low cost and without spoiling the machine for standard molding techniques that now occur when the power driven conversion screw units are installed on conventional injection machines.

A further object of this invention is to provide a fully concentric flow channel leading without interruption to the nozzle through the concentric passage of the screw.

A further object of this invention is to provide a novel mixing and mulling action by passing hot plastic through and between rotating bearings within a plasticizing cylinder.

A further object of this invention is to provide a screw type plasticizing chamber which may be easily dismantled for cleaning without removal of the heating cylinder from the injection molding machine.

A further object of the invention is to provide a simplified means of agitation of melted plastic material inside an injection molding plasticizing cylinder by utilizing the pressure of the plunger already on the machine to force the material through and around the flights of a freely rotating screw.

A further object of the invention is to provide a greatly increased surface area for more efficient heat transfer within a heating cylinder of a plastic injection molding machine by use of a reverse flow passageway and a freely rotating screw spreader.

A further object of the invention is to provide a shearing and wiping action by free rotation of a screw so that the screw flights wipe the plasticized material away from the hot wall of the heating cylinder to thereby eliminate burning of the material and insure complete plasticizing of the new and cooler material.

Another purpose of the invention is to eliminate the bearing and screw mounting problems which have prevented successful use of screw type spreaders in the prior art plastic injection molding device.

It is a more specific object of this invention to provide a rotatable spreader for a plasticizing cylinder which will rotate from one to five times per injection cycle, depending upon the amount of plastic forced through the machine, so as to improve the speed of melting and the quality of the melt over that produced by conventional stationary spreaders normally used in the plasticizing of thermoplastic material.

Other and more specific objects of the invention will be apparent from the detailed description to follow.

In the drawings:

FIG. 1 is a longitudinal cross-sectional view of a floating screw plasticizing cylinder mounted in a plastic injection molding device;

FIG. 2 is an enlarged fragmentary view of the reverse flow end structure and bearing mounted screw end;

FIG. 3 is a cross-sectional view taken along the line 3—3 of FIG. 1.

In the several views of the drawings, like parts are designated by like numerals throughout.

The floating screw plasticizing cylinder of this invention is for use with plastic injection molding machines of conventional type and is generally designated by the numeral 10 in FIG. 1. The plasticizing cylinder assembly includes a heated elongated metal barrel or housing means 20 of generally cylindrical shape having an axial bore 21 therethrough extending between a material discharge end at an end opposite thereto. As is conventional in the art a plurality of electrical or other heating means may be provided around the periphery of the housing 20 in heat conducting relation thereto to provide heat for fluidizing the thermoplastic material.

An elongated rotating member 30 having a tapered helical root groove 31 about the periphery thereof is disposed in tight fitting rotational relation within the bore 21 of the housing 20 throughout a portion 22 of its length. The helical groove 31 and the outer periphery of the member 30 are defined by flights 33 thereon. The groove or passage 31 is preferably, but not necessarily, of decreasing cross-sectional area from the end opposite the material discharge end toward the discharge end to facilitate densification of the thermoplastic material flowing therethrough.

Adjacent to the discharge end of the elongated housing 20 is an end cap structure 40 which is secured, by means of bolts 41, in face-to-face registered engagement with the end of the housing 20. Suitably tapped holes 23 are provided in the housing to receive the shanks 42 of bolts 41 which pass through flange portion 43 of the end structure. The end structure 40 has a central passageway 45 disposed therethrough in coaxial alignment with the bore 21. The exposed end of the passage 45 remote from the housing 20 has a counterbored and tapped portion 46 having threadedly secured therein a conventional injection mold nozzle 47 for connection to an injection mold or the like. Suitable gasket means are placed in the bottom of the counterbored portion 46 to prevent flow of plastic materials into the threads thereof. The nozzle 47 may be of any one of a variety of forms well known to those skilled in the art, such as for example, the shutoff valve type specially designed to prevent drooling.

An annular groove 48 concentric with the central passage 45 of the end structure 40 is provided in the face of said end structure abutting the housing 20, and has an outer diameter substantially equal to the diameter of the bore portion 22. A curved base portion 49 of the groove 48 acts as a bearing race or bearing seat for a plurality of ball bearings 50 of complementary shape to the curve of the seat 49 and mounted in circumferential array about the groove 48. The adjacent end of the rotating screw 30 is provided with a cup shaped recessed portion 34 such that when the side walls 35 of the cup are moved axially against the balls 50 a continuous reverse passage 52 is defined by the walls 35 and the end structure 40.

The dimensions of the reverse passageway 52 are carefully selected such that the proper amount of flow of plastic from the helical passage 31 occurs to provide a uniform concentric flow into the central passageway 45 of the end structure 40. Flow of fluidized thermoplastic through the reverse passageway 52 is accomplished between the rotating balls 50 such that a mulling and turning of the hot plastic occurs at this point. The end of the walls 35 which engage the balls 50 are provided with complementary concave curves 36 for smooth and anti-friction engagement therewith.

Adjacent the end of the housing 20 and axially of the screw 30 and the bore portion 22 of the axial bore 21 is a bore portion 24 of somewhat reduced diameter than that of the bore portion 22. The portions 22 and 24 are conveniently separated from each other by a tapered bore portion 23 which facilitates a smooth flow of the plastic material through the bore 21.

Slidably fitted within the bore portion 24 is a reciprocating plunger 25 of the conventional type found on injection molding machines. The plunger 25 reciprocates within the bore portion 24 by means of conventional reciprocating drive means in a manner which will be readily understood by those skilled in the art. The plasticizing cylinder 20 is secured to the conventional injection molding machine by means of a threaded extension portion 26 on the end remote from the end structure 40 thereof. Intermediate the ends of the bore portion 24 adjacent the path of the reciprocating plunger 25 is an aperture 27 through the wall of the cylindrical housing 20. A conventional material reservoir such as a gravity feed hopper or other conventional means such as a feed weighing device is provided for maintaining a steady supply of granular plastic material through the aperture 27 when the plunger 25 is reciprocated away from the discharge end of the cylinder past the aperture 27 and toward the threaded end 26. The reservoir means is illustrated in phantom in FIG. 1 in the form of a gravity feed hopper located above the aperture 27.

The operation of the floating screw plasticizing cylinder of the invention in combination with a conventional injection molding machine is such that upon retraction of the plunger 25 in the direction of the threaded end 26 of the housing 20 a flow of plastic granular material through aperture 27 is created which substantially fills the open bore portion 24, then as the forward stroke of the plunger 25 in the direction of the discharge end occurs, the cold granular plastic material is densified and moved forward ahead of the plunger 25 through the bore portion 24 and into the tapered bore portion 23. This densification creates substantial pressures within the plasticizing cylinder as it forces the plastic into engagement with the flights 33 of the freely mounted screw 30.

As the pressure increases and the granular plastic material moves through the helical passage 31 the screw 30 is driven by the flow of plastic material through it into a rotation of approximately three revolutions per stroke of the plunger 25. The rotation of the screw 30 occurs because of the angle of force at which the plastic engages the flights, thereby creating a component of force in a peripheral direction to rotate the helical spreader 30. The balls 50 during this rotation perform both an anti-friction function and a function of mulling the plastic as it is passed through the reverse flow passageway 52 between the rotating balls.

As will be seen from FIG. 1, the densification of the plastic material during the forward stroke of the plunger 25 is enhanced by the gradual decrease in cross-sectional area of the passageway 31. The provision of this taper in the passageway is not necessary and a standard screw may be used with a slight sacrifice in the densification efficiency. As the thermoplastic material starts through the passageway 31 in the bore portion 22 and proceeds on through the reverse flow passage 52 past the balls 50 into the central passage 45 of the end structure, it is continually increased in its fluidity by heat transfer from the cylindrical housing 20. The mulling, stirring and shearing action created by the flights 33 in cooperation with the bore portion 22 causes a wiping and shearing action which insures complete and even heating of the plastic material without damage or decomposition of any portion of the material from overheating.

The flow of the fluidized plastic through the reverse flow passageway increases the distance it travels and therefore insures fluidity and even distribution of the plastic into the discharge passageway 45 of the end structure 40, such that a uniform and quality melt is produced at the discharge nozzle 47 for injection into the mold. Moreover, as a result of the combined action of the reverse flow passage, the freely rotating spreader, and the rotating balls, the speed of melting and the quality of the melt produced is increased beyond that obtained from conventional stationary or externally driven spreaders commonly used in plasticizing cylinders.

A suitable modification of the floating screw plasticizing member is contemplated in the provision of a multiple lead screw for increasing the churning action imparted to the melting plastic material. The advantages of such a provision will be readily recognized by those skilled in the art, in view of the greatly increased surface area provided on a double lead screw spreader as opposed to the limited surface area found on the standard fluted or straight through type spreaders normally used.

It will be apparent that in the embodiment of the invention shown and described in connection with FIGS. 1-3 it is not necessary to provide the end structure 40 with apertures and bolts for securing it to the housing 20 as illustrated, since, obviously, the cylinder may be welded at the front joint in a manner known to the art. The provision of the bolted end structure, however, in combination with the novel method of bearing mounting the axially fixed freely rotating screw spreader, provides for easy dismantling the entire plasticizing chamber for cleaning without removal of the heating cylinder from the injection molding machine.

It will be recognized that the drawings illustrate only the plasticizing, reservoir, and pressure plunger portions of a conventional injection molding machine. In use, the invention would include appropriate drive means and conventional tightly clamped injection mold apparatus connected to the discharge nozzle 47. For ease of description the principles of the invention have been set forth in connection with but a single illustrated embodiment showing the essential functional and structural nature of the combination. It is not my intention that the illustrated embodiment nor the terminology employed in describing it be limiting, inasmuch as variations of these may be made without departing from the spirit of the invention. Rather we desire to be restricted only by the scope of the appended claims.

The invention claimed is:
1. A floating screw plasticizing cylinder for use in a plastic injection molding device comprising:
   an elongated housing means having an axial bore;
   an end structure having a reverse flow passage and a discharge opening therein;
   an axially fixed free rotating screw mounted in said end structure and in a first portion of said bore and defining with said first portion a helical passage in communication with said discharge opening through said reverse flow passage;
   the end of said screw adjacent said end structure defining with a portion of said reverse passage a bearing race;
   ball bearings disposed in said race such that flow of fluidized plastic through said reverse passage is between said balls;
   a granular material reservoir in communication with a second portion of said axial bore axially remote from said end structure through an aperture intermediate the ends thereof;
   a plunger slidably mounted in said second portion for driven reciprocating movement past said aperture sequentially to open said aperture and introduce material into said second portion and to close said aperture and compress said material to create substantial pressure in said passages and through said discharge opening while stirring said material in said passages with said free rotating screw and said balls.

2. The floating screw plasticizing cylinder of claim 1 in which the material reservoir is mounted above the aperture to provide a gravity feed of granular material into said bore.

3. The floating screw plasticizing cylinder of claim 1 in which the rotationally driven member is a screw with a decreasing depth of thread in the direction of the discharge opening.

4. The floating screw plasticizing cylinder of claim 1 in which the housing is electrically heated about its periphery.

5. The floating screw plasticizing cylinder of claim 1 in which the discharge opening is dimensioned to provide a pressure in excess of 15,000 p.s.i.

6. A floating spreader plasticizing cylinder for use in a plastic injection molding device comprising:
   an elongated housing means having an axial bore;
   an end structure having a reverse flow passage and a discharge opening therein;
   an axially fixed free rotating spreader mounted in said end structure and in a first portion of said bore and defining with said first portion a continuous passage in communication with said discharge opening through said reverse flow passage;
   the end of said screw in said end structure defining with a portion of said reverse passage a bearing race;
   spaced bearings disposed in said race such that flow of melted plastic material through said reverse passage is between said bearings;
   a granular material reservoir in communication with a second portion of said axial bore axially remote from said end structure through an aperture intermediate the ends thereof;

a plunger slidably mounted in said second portion for driven reciprocating movement past said aperture sequentially to open said aperture and introduce material into said second portion and to close said aperture and compress said material to create substantial pressure in said passages and through said discharge opening while stirring said melted plastic material in said passages with said free rotating screw and said bearings.

References Cited in the file of this patent

UNITED STATES PATENTS

| | | |
|---|---|---|
| 2,702,410 | Brown | Feb. 22, 1955 |
| 2,764,781 | Kelly | Oct. 2, 1956 |
| 2,961,706 | Swenson | Nov. 29, 1960 |
| 2,977,634 | Morse | Apr. 4, 1961 |
| 3,010,154 | Swenson | Nov. 28, 1961 |

FOREIGN PATENTS

| | | |
|---|---|---|
| 334,039 | Switzerland | Dec. 31, 1958 |